United States Patent
Ong et al.

(10) Patent No.: US 7,695,269 B2
(45) Date of Patent: Apr. 13, 2010

(54) APPARATUS AND METHOD FOR IN-MOLD DEGATING

(75) Inventors: See Yap Ong, Singapore (SG); Si Liang Lu, Singapore (SG); Zheng Yu Gao, Singapore (SG); Swee Huat Lee, Singapore (SG)

(73) Assignee: ASM Technology Singapore Pte Ltd., Singapore (SG)

( * ) Notice: Subject to any disclaimer, the term of this patent is extended or adjusted under 35 U.S.C. 154(b) by 223 days.

(21) Appl. No.: 11/753,917

(22) Filed: May 25, 2007

(65) Prior Publication Data

US 2007/0278710 A1    Dec. 6, 2007

Related U.S. Application Data

(60) Provisional application No. 60/809,240, filed on May 30, 2006.

(51) Int. Cl.
*B29C 45/38* (2006.01)
(52) U.S. Cl. .............. 425/436 RM; 425/298; 425/436 R; 425/577
(58) Field of Classification Search .......... 425/436 RM, 425/436 R, 556, 577, 441, 443, 438, 116, 425/553, 554, 298
See application file for complete search history.

(56) References Cited

U.S. PATENT DOCUMENTS

| | | | | |
|---|---|---|---|---|
| 5,472,334 A | * | 12/1995 | Takahashi | 425/554 |
| 5,783,134 A | * | 7/1998 | Yabe et al. | 264/272.14 |
| 6,113,828 A | * | 9/2000 | Feick | 264/161 |
| 7,431,580 B2 | * | 10/2008 | Chiang | 425/190 |
| 2006/0093701 A1 | * | 5/2006 | Adams et al. | 425/553 |
| 2006/0214332 A1 | * | 9/2006 | Fernandes et al. | 264/328.2 |
| 2007/0144010 A1 | * | 6/2007 | Sato et al. | 29/898 |
| 2007/0190204 A1 | * | 8/2007 | Chiang | 425/577 |
| 2008/0175947 A1 | * | 7/2008 | Wei et al. | 425/554 |

* cited by examiner

*Primary Examiner*—Yogendra Gupta
*Assistant Examiner*—Emmanuel S Luk
(74) *Attorney, Agent, or Firm*—Ostrolenk Faber LLP

(57) ABSTRACT

An apparatus and method for degating is provided for separating excess molding material from encapsulated electronic packages while the electronic packages are located in a molding system. At least one holding device is coupled to a mold of the molding system, which is located such that excess molding material is molded onto at least a portion of the holding device during molding. A locking feature on the portion of the holding device locks the excess molding material such that the holding device may hold the excess molding material molded onto it to forcibly separate the excess molding material from the encapsulated electronic packages after molding.

18 Claims, 4 Drawing Sheets

APPARATUS AND METHOD FOR IN-MOLD DEGATING

CROSS REFERENCE TO RELATED APPLICATION

This application claims the benefit and priority of U.S. Provisional Application Ser. No. 60/809,240 filed May 30, 2006, and entitled APPARATUS AND METHOD FOR IN-MOLD DEGATING, the disclosure of which is incorporated herein by reference.

FIELD OF THE INVENTION

The invention relates to the molding of electronic devices, and in particular to the automatic removal of excess molding compound from molded electronic packages after molding.

BACKGROUND AND PRIOR ART

During the assembly of semiconductor packages, semiconductor chips are often attached onto carriers, such as substrates or leadframes, for processing multiple semiconductor chips at the same time. After or during attachment, electrical connections are made between electrical pads on the chips to corresponding contacts or connection pads on the substrates or leadframes. This can be done by wire bonding, or the electrical pads can be directly attached onto the contacts on the substrates or leadframes. Thereafter, it is usually necessary to protect the chips and the electrical connections from the environment by encapsulating them in a molding compound, such as epoxy molding compound ("EMC").

In a typical transfer molding process, the substrate or leadframe with the chips attached is placed into a molding system comprising two mold halves. One or more molding cavities are formed in one or both of the mold halves corresponding to the positions of the chips to be encapsulated. Molding compound is introduced into mold supply pots in the molding system, typically in pellet form. The mold supply pots are linked to the molding cavities through a system of runners and gates through which the molding compound is channeled before entering the cavities. A plunger is insertable into each pot under heat and pressure to crush the pellet and distribute molding compound under the pressure from the plunger through the system of runners and gates and into the molding cavities.

After the cavities have been filled, the molding compound is allowed to set. Besides molding compound that is filled into the cavities for encapsulation, excess molding compound is also created inside to the mold supply pot, and in the runners and gates.

FIG. 1 is a plan view of a molding surface of a lower mold 10 including leadframes 12 that have been encapsulated in the mold 10. Each leadframe 12 contains encapsulated packages 14 corresponding to positions of semiconductor chips that have been attached onto the leadframe 12. Excess molding material 15 is still attached to the encapsulated packages 14, and it can be conveniently referred to as the cull 16, runner 18 and gate 20 portions of the excess molding material 15. The encapsulated portion corresponding to the encapsulated packages 14 protects internal components (not shown) on the leadframe 12 and would be retained. The cull portion 16, runner portion 18 and gate portion 20 are not used and thus need to be removed and discarded before further processing of the leadframe 12.

Conventionally, an offloading arm will transfer the molded carriers from the lower mold 10 to a degating tool. Degating generally involves a process of clamping, punching or flipping the excess molding material to separate it from the electronic packages, and a special degating tool is used to undertake the process. The degated carrier is then transferred to yet another station for further processing as appropriate.

However, the aforesaid conventional degating approach has a number of shortcomings. A major disadvantage is that a separate station is required to accommodate the degating tool. This necessitates a higher cost involved in manufacturing a separate degating tool, and a larger resultant machine footprint takes up valuable floor space. Another disadvantage is that the degating tool has to be custom-made and can only be designed after the design of the mold tool is completed. Furthermore, the degating result, and therefore the quality of the encapsulated packages, cannot be known immediately after molding is performed, as it has to go through the degating station first. The need to have a separate station also means that time is allowed for the carrier to cool, which can be undesirable for some packages if warpage or thermal stress results after cooling.

SUMMARY OF THE INVENTION

It is thus an object of the invention to seek to perform the degating process while the encapsulated electronic packages are still in the mold in order to avoid the need for a separate degating station as well as to avoid some of the other aforesaid disadvantages of the conventional approach.

According to a first aspect of the invention, there is provided a degating apparatus for separating excess molding material from encapsulated electronic packages in a molding system, the degating apparatus comprising: at least one holding device coupled to a mold of the molding system that is located such that excess molding material is molded onto at least a portion of the holding device during molding; and a locking feature on the portion of the holding device that is molded for locking the excess molding material to the holding device; wherein the holding device is operative to hold the excess molding material molded onto it and to forcibly separate the excess molding material from the encapsulated electronic packages after molding.

According to a second aspect of the invention, there is provided a method for separating excess molding material from encapsulated electronic packages in a molding system, comprising the steps of: locating at least one holding device coupled to a mold of the molding system at a position where excess molding material is formed during molding; molding the excess molding material onto at least a portion of the holding device during molding such that excess molding material is locked onto a locking feature comprised in the holding device; and thereafter holding the excess molding material with the holding device to forcibly separate it from the encapsulated electronic packages after molding.

It would be convenient hereinafter to describe the invention in greater detail by reference to the accompanying drawings which illustrate preferred embodiments of the invention. The particularity of the drawings and the related description is not to be understood as superseding the generality of the broad identification of the invention as defined by the claims.

BRIEF DESCRIPTION OF THE DRAWINGS

An example of a preferred embodiment of an in-mold degating apparatus and method in accordance with the invention will now be described with reference to the accompanying drawings, in which.

DETAILED DESCRIPTION OF THE PREFERRED EMBODIMENT OF THE INVENTION

Figure 2:
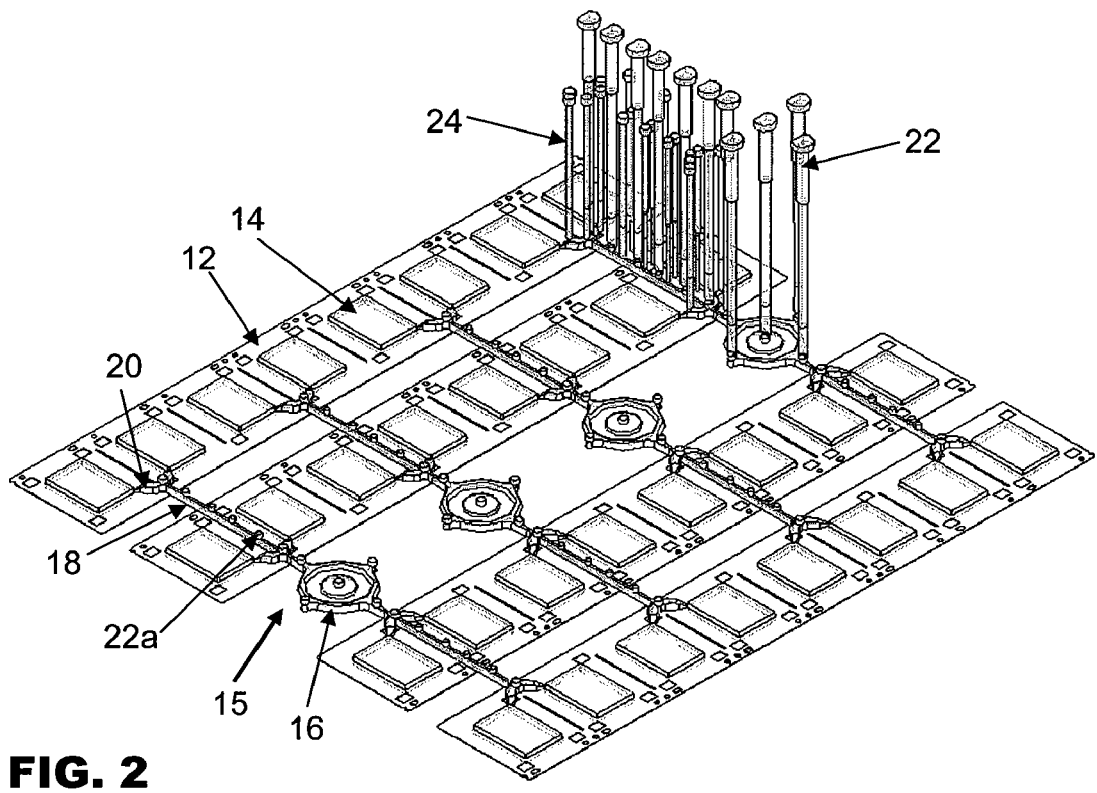
FIG. 2 is an isometric view of the leadframes including illustrations of positions of holding pins and ejector pins of a degating apparatus according to the preferred embodiment of the invention.

FIG. 2 is an isometric view of electronic devices in the form of leadframes 12 including illustrations of positions of holding devices such as holding pins 22, and ejector devices such as ejector pins 24, of a degating apparatus according to the preferred embodiment of the invention. Multiple holding pins 22 are distributed over a location where a strip of excess molding material is molded and are arranged to hold the strip of excess molding material 15, which may comprise the cull 16, runners 18 and gates 20. There should preferably be sufficient holding pins 22 to support multiple strips of excess molding material 15 so that the different strips of material can be forcibly separated from the encapsulated electronic packages 14 at the same time without the likelihood of any strip of excess molding material 15 cracking when performing detachment.

For clarity, holding pins 22 have only been illustrated for one strip of excess molding material 15. However, it should be appreciated that in practice, holding pins 22 would be provided for all the different strips of the excess molding material 15 for detaching them simultaneously. The positions whereat the other holding pins 22 should be positioned are represented by raised protrusions 22a which are preferably distributed regularly over the cull 16, runners 18 and gates 20.

Figure 1:
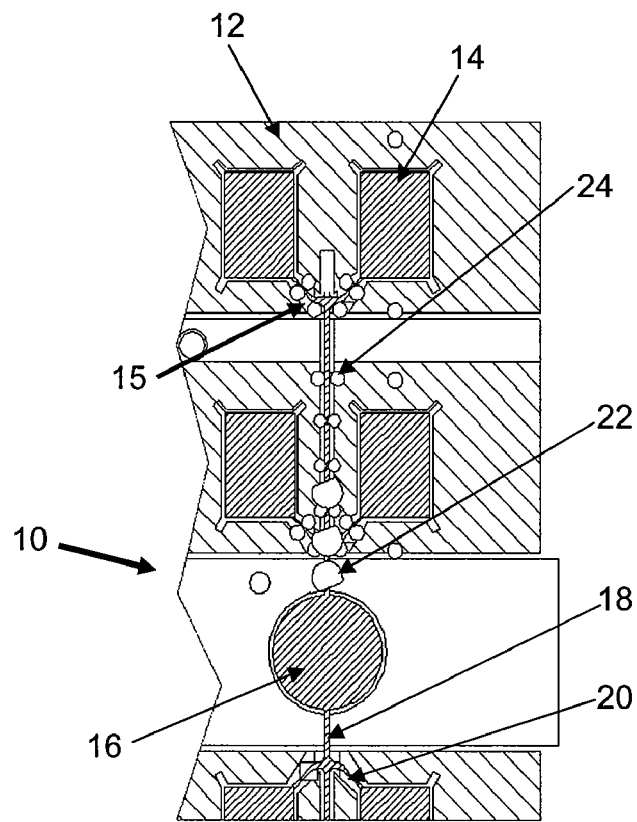
FIG. 1 is a plan view of a molding surface of a lower mold including leadframes that have been encapsulated in the mold.

Whereas the holding pins 22 are used to support and forcibly pull the excess molding material 15 away from the encapsulated packages 14, there are also a plurality of ejector pins 24 to contact the leadframes 12 and push the leadframes 12 away from the excess molding material 15. The ejector pins 24 are preferably spring-biased in the direction of the leadframe 12 to contact the leadframe 12. They are distributed regularly along the sides of the cull 16, runners 18 and gates 20, and they are arranged to push the leadframes 12 but not the excess molding material 15 for promoting detachment of the excess molding material 15 away from the encapsulated packages 14. In the configuration shown in FIG. 2, the excess molding material 15 will break away from the encapsulated packages 14 at each interface between the gates 20 and encapsulated packages 14, leaving only the encapsulated packages 14 that have been molded onto the leadframes 12. A plan view showing the arrangement of some of the holding pins 22 and ejector pins 24 can be seen in FIG. 1.

Figure 3:
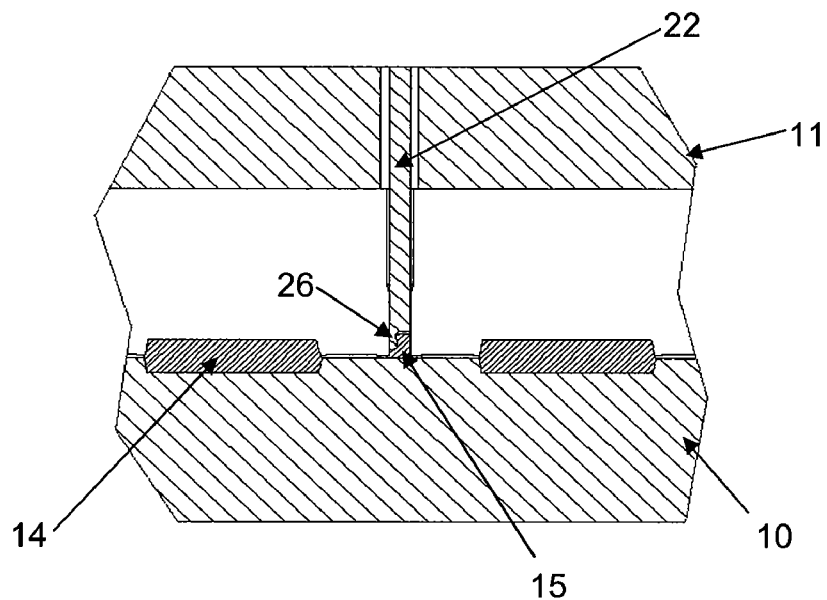
FIG. 3 is a side view of a molding tool in a closed state just after molding has been performed.

FIG. 3 is a side view of a molding tool in a closed state just after molding has been performed. The molding tool comprises a lower mold 10 and an upper mold 11. The lower and/or upper molds 10, 11 have cavities for forming the encapsulated packages 14. The holding pins 22 are coupled to the upper mold 11. They are inserted through holes formed in the upper mold 11 that are oriented perpendicularly to the molding surfaces and parallel to the opening and closing directions of the lower and upper molds 10, 11. A tip or end of each holding pin 22 onto which excess molding material 15 is molded further comprises a locking feature, which may be in the form of a hook-like protrusion or notch 26 with a curved indented surface for locking and holding excess molding material 15 that flows into contact with, and solidifies onto, the notch 26. Preferably, the notch 26 is formed only on one side of the holding pin 22.

When the upper mold 11 is lifted to open the molding tool in the preferred embodiment, the holding pins 22 are fixed relative to the upper mold 11 during opening of the upper mold 11 such that it is configured to move together with the upper mold 11. The holding pins 22 that have engaged the excess molding material 15 will hold onto and lift the excess molding material 15 together with the upper mold 11. Simultaneously, the ejector pins 24 are forcibly extended to push against the leadframes 12 and help to separate the excess molding material 15 from the leadframes 12 and encapsulated packages 14. As a result, the excess molding material 15 will be forcibly separated and break away from the encapsulated packages 14 at the interfaces between the gates 20 and encapsulated packages 14.

Figure 4:
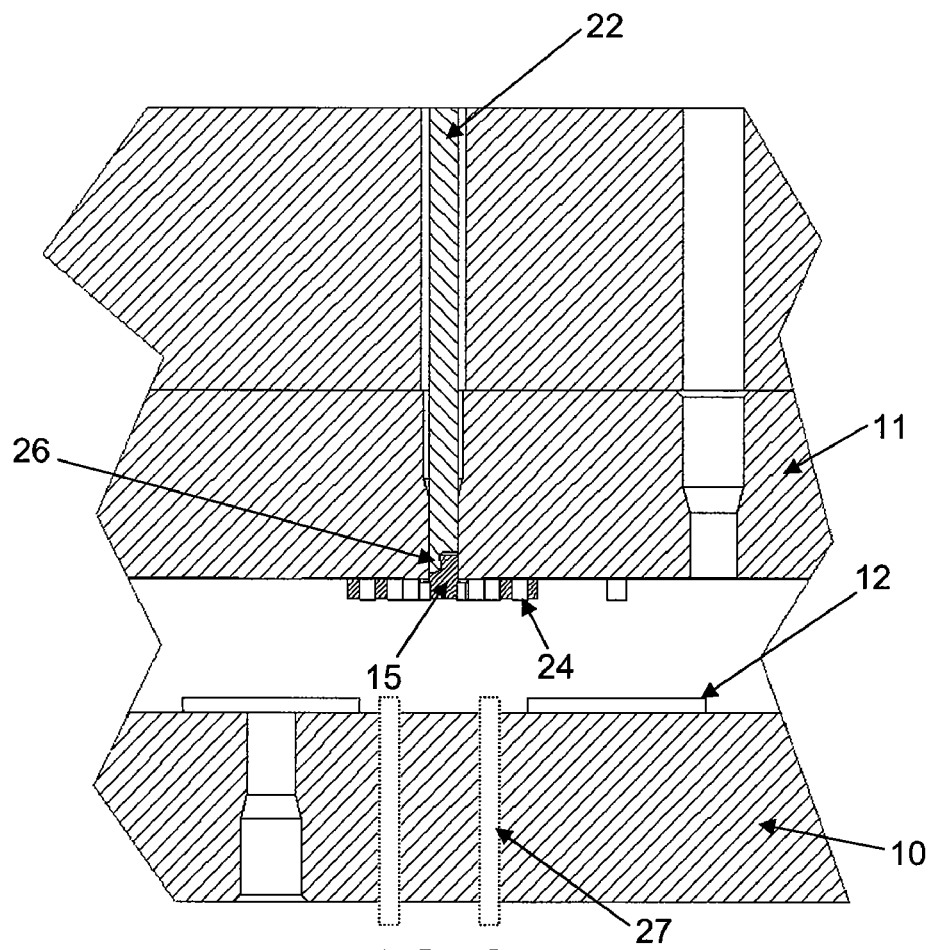
FIG. 4 is a side view of the molding tool in an open state with the excess molding material having been separated from the encapsulated packages.

FIG. 4 is a side view of the molding tool in an open state with the excess molding material 15 having been separated from the encapsulated packages 14. The holding pin 22 is supporting the excess molding material 15 to contact the upper mold 11, with the notch 26 acting as the support mechanism for the excess molding material 15. The ejector pins 24 adjacent to the holding pins 22, and which are also coupled to the upper mold 11, are lifted together with the upper mold 11.

Optionally, if the molding material is soft and/or pliable, an additional support device, which may be in the form of push-up pins 27 may be included in the bottom mold 10. The push-up pins 27 help to lift and separate the excess molding material 15 at the same time as it is forcibly separated from the encapsulated packages 14 by the holding pins 22. It may also reduce the risk of breakage of the excess molding material 15 during separation.

Figure 5:
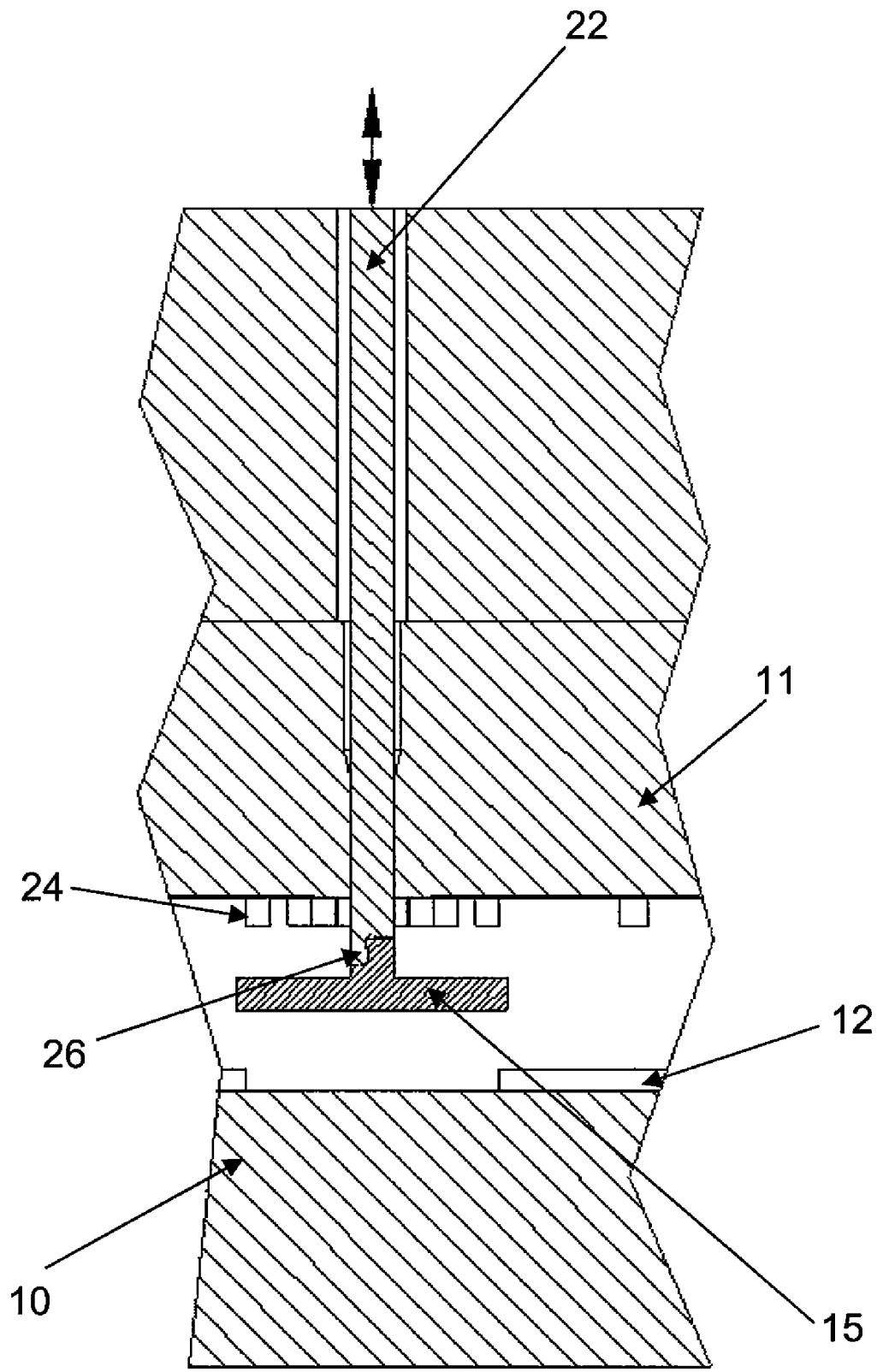
FIG. 5 is a side view of the excess molding material being lowered so that it is suspended between the lower and upper molds of the opened molding tool.

Thereafter, the holding pin 22 is operative to move relative to the upper mold 11 so as to position the excess molding material relative to the molds 10, 11. FIG. 5 is a side view of the excess molding material 15 being lowered away from the upper mold 11 so that it is suspended between the lower and upper molds 10, 11 of the opened molding tool. In this position, the excess molding material 15 has a clearance from the upper mold 11 as well as the ejector pins 24 and is ready for removal from the molding system.

Figure 6:
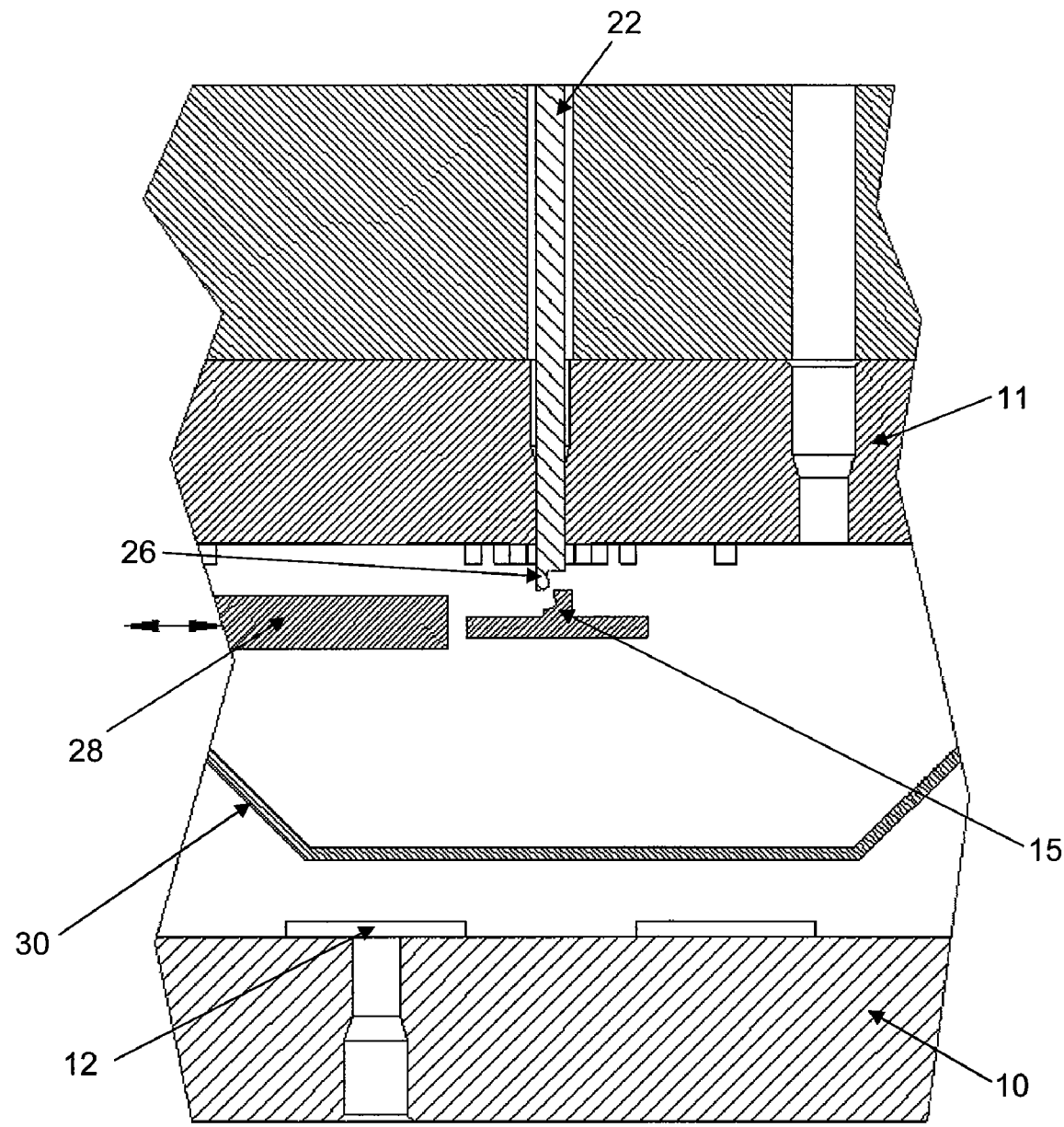
FIG. 6 is a side view of the excess molding material being dislodged from the holding pin for removal from the molding system.

FIG. 6 is a side view of the excess molding material 15 being dislodged from the holding pin 22 for removal from the molding system. A removal device, such as pusher 28, and a bin 30 are introduced into the space between the lower and upper molds 10, 11. The pusher 28 is driven horizontally to push the excess molding material 15 in a direction away from the indentation of the notch 26 so as to dislodge the excess molding material 15 from the notch 26. The bin 30 is positioned underneath the excess molding material 15 to collect the excess molding material 15 when it falls. Thereafter, the pusher 28 and bin 30, together with the excess molding material 15, are moved outside the molding system. The leadframes 12 and encapsulated packages 14, with the excess molding material 15 having been automatically removed, can then be offloaded for further processing as appropriate without the need for a separate degating station.

It would be appreciated that the in-mold degating system according to the preferred embodiment of the invention enables the degating process to be performed in-mold. In other words, degating may be performed at the moment when the mold is opened. This leads to a smaller machine footprint due to elimination of the need for a separate degating station. There are also likely to be cost savings in not having to manufacture a separate degating station. Other advantages include faster processing, avoidance of a separate degating module tooling cost, and reduction of design time because no degating tooling design is needed.

Further, the degating result can be known immediately once the molding tool is opened, whereas in the prior art, one would have to monitor the result only after the leadframe passes through the separate degating system. Moreover, since degating is done when the leadframe and encapsulated packages are still hot, there is less warpage in the leadframe and less thermal stress is generated. These factors can result in better overall quality of the encapsulated packages.

The invention described herein is susceptible to variations, modifications and/or additions other than those specifically described and it is to be understood that the invention includes all such variations, modifications and/or additions which fall within the spirit and scope of the above description.

The invention claimed is:

1. A degating apparatus for separating excess molding material from encapsulated electronic packages in a molding system having an upper mold and a lower mold which clamps onto the upper mold with a parting plane at a meeting of the upper mold and the lower mold, the degating apparatus comprising:
   at least one holding device in the form of a pin coupled to the upper mold of the molding system, the holding device terminating in a tip portion remote from a lower mold, the tip portion being located such that excess molding material is molded onto the tip portion of the holding device during molding; and
   a locking feature on the tip portion of the holding device that is molded for locking the excess molding material to the holding device;
   wherein the holding device is operative to hold the excess molding material molded onto it and to forcibly separate the excess molding material from the encapsulated electronic packages after molding, and
   the encapsulated electronic packages, excess molding material and tip portion of the holding device being located substantially along the parting plane at the meeting of the upper and lower molds in a closed state of the molding system.

2. The degating apparatus as claimed in claim 1, further comprising multiple holding devices distributed over a location where a strip of excess molding material is to be molded which are operative to hold the strip of excess molding material.

3. The degating apparatus as claimed in claim 2, further comprising multiple holding devices distributed over locations where multiple strips of excess molding material are to be molded which are operative to hold the multiple strips of excess molding material.

4. The degating apparatus as claimed in claim 1, further comprising an ejector device that is biased to contact an electronic device on which the encapsulated electronic packages are formed in order to push the electronic device away from the excess molding material.

5. The degating apparatus as claimed in claim 4, wherein the ejector device and the holding device are coupled to the same mold and are located adjacent to each other.

6. The degating apparatus as claimed in claim 1, further comprising a hole formed in the mold that is oriented perpendicularly to a molding surface of the mold for inserting the holding device.

7. The degating apparatus as claimed in claim 1, wherein the locking feature comprises a notch formed at an end of the holding device.

8. The degating apparatus as claimed in claim 7, wherein the notch comprises a curved indented surface on the holding device.

9. The degating apparatus as claimed in claim 7, wherein the notch is formed only on one side of the holding device.

10. The degating apparatus as claimed in claim 1, wherein the holding device is fixed relative to the mold during opening of the mold such that it is configured to move together with the mold during opening thereof.

11. The degating apparatus as claimed in claim 10, wherein the holding device is further operative to move relative to the mold to which it is coupled so as to position the excess molding material held by it relative to the mold after the mold has been opened.

12. The degating apparatus as claimed in claim 1, further comprising a support device coupled to another mold that is operative to support the excess molding material during separation of excess molding material from the encapsulated electronic packages by the holding device.

13. The degating apparatus as claimed in claim 1, further comprising a removal device operative to dislodge the excess molding material from the locking feature of the holding device.

14. The degating apparatus as claimed in claim 13, wherein the removal device is operative to push excess molding material away from the holding device.

15. The degating apparatus as claimed in claim 13, further comprising a bin positionable under the holding device for collecting the excess molding material that is dislodged.

16. The degating apparatus as claimed in claim 1, wherein the at least one holding device configured to engage the excess molding material on a peripheral surface of itself.

17. The degating apparatus as claimed in claim 1, the locking feature being formed to a lateral side of the holding device.

18. A molding system for encapsulating electronic packages, the molding system comprising:
   an upper mold and a lower mold which clamps onto the upper mold with a parting plane at a meeting of the upper mold and the lower mold; and
   a degating apparatus for separating excess molding material from encapsulated electronic packages, the degating apparatus comprising:
   at least one holding device in the form of a pin coupled to the upper mold of the molding system, the holding device terminating in a tip portion remote from a lower mold, the tip portion being located such that excess molding material is molded onto the tip portion of the holding device during molding; and
   a locking feature on the tip portion of the holding device that is molded for locking the excess molding material to the holding device;
   wherein the holding device is operative to hold the excess molding material molded onto it and to forcibly separate the excess molding material from the encapsulated electronic packages after molding, and
   the encapsulated electronic packages, excess molding material and tip portion of the holding device are located substantially along the parting plane at the meeting of the upper and lower molds in a closed state of the molding system.

* * * * *